United States Patent [19]

Kan et al.

[11] 3,912,831

[45] Oct. 14, 1975

[54] RECORDING MATERIAL

[76] Inventors: Masao Kan, 1-59, 1-Chome, Matsugaoka, Chigasaki, Kanagawa; Hirokazu Ishii, 790-1, Okamoto, Kamakura, Kanagawa; Yasuzo Murata, 2135-5, Ninomiya, Ninomiya, Naka-Gun, Kanagawa; Takayuki Maruya, 37-12, Hanamizudai; Akio Yamada, 855, Shinomiya, both of Hiratsuka, Kanagawa, all of Japan

[22] Filed: Dec. 3, 1973

[21] Appl. No.: 420,884

Related U.S. Application Data

[63] Continuation of Ser. No. 191,783, Oct. 22, 1971, abandoned.

[30] Foreign Application Priority Data

| Oct. 24, 1970 | Japan | 45-93757 |
|---|---|---|
| Apr. 9, 1971 | Japan | 46-5718 |
| June 30, 1971 | Japan | 46-48352 |
| Sept. 13, 1971 | Japan | 46-71359 |
| Oct. 20, 1971 | Japan | 46-83032 |
| Sept. 28, 1971 | Japan | 46-76135 |
| Oct. 22, 1971 | Japan | 46-83716 |

[52] U.S. Cl. .............. 427/145; 252/316; 427/150; 428/411
[51] Int. Cl.² ................... B41M 5/02; B41M 5/12
[58] Field of Search ............... 117/36.2, 36.8, 36.9; 252/316

[56] References Cited

UNITED STATES PATENTS

| 1,950,982 | 3/1934 | Gookin et al. | 117/36.2 |
|---|---|---|---|
| 2,749,253 | 6/1956 | Shoemaker et al. | 117/36.8 |
| 3,535,139 | 10/1970 | Watanable et al. | 117/36.2 |
| 3,539,375 | 11/1970 | Baum | 117/36.2 |

*Primary Examiner*—Thomas J. Herbert, Jr.
*Attorney, Agent, or Firm*—Robert E. Burns; Emmanuel J. Lobato; Bruce L. Adams

[57] ABSTRACT

A recording material which is produced through the reaction of two kinds of color formers, namely a metallosilane compound and a polyhydroxyphenol.

According to the invention, clearly printed, typed or handwritten letters or figures are easily formed on a substrate, with an excellent fastness against light, heat, water, and chemicals, and with an excellent color tone.

16 Claims, No Drawings

RECORDING MATERIAL

RELATED APPLICATION

This application is a continuation application of U.S. patent application Ser. No. 191,783 filed Oct. 22, 1971 and herewith abandoned.

FIELD OF THE INVENTION

The present invention relates to a recording material, in which a complex is produced through reaction of a metallic compound and a ligand with the aid of an oil medium thereby to form clearly printed, typed or handwritten letters or figures on a substrate, or a base material.

BACKGROUND OF THE INVENTION

The inventions of U.S. Pat. No. 2299693 and 3011905 are well known as a recording material which utilizes a reaction forming a complex from a metallic compound and a ligand. The metallic compounds used in these inventions are the usual metallic salts such as ferric ammonium sulfate, ferric chloride and cupric sulfate. When used as color formers, these compounds suffer from disadvantages such as a narrow pH region and deliquescence. Moreover, these metallic salts are soluble in water, but are hardly soluble in oil, and therefore have disadvantages such as insufficiency in both stability and preservation over a long time. Letters obtained through the color reaction of the above mentioned metallic salt and ligand are not resistive against humidity and light.

Furthermore, there are some recording materials formed by combining metallic compounds and ligands, which will color-develop with the aid of the oil medium. However, these recording materials also suffer from disadvantages that the color development rate between the two color formers is low, and the color formers, especially the metallic compounds, are poor in solubility with respect to the oil medium, as a result of which the coloration rate is low with an insufficient color intensity. In other words, said recording materials are not completely satisfactory as recording material.

In addition, there are known capsule-type recording materials (no-carbon papers), which are obtained by coating clays and micro-capsules having oil solutions of colorless leuco-compounds, such as crystalviolet lactone, and benzoyl leucomethylene blue on sheets. These recording materials are color-developed by the reaction of the colorless leuco-compounds and the clays, after breaking the capsules by pressure.

However, these materials thus obtained are deficient in fastness especially against light, and the color easily fades.

Therefore, such colored materials cannot be used as original figures for obtaining clear heat-sensitive and light sensitive copies.

SUMMARY OF THE INVENTION

A primary object of the present invention is to provide a novel recording material which causes coloration by forming a complex with the aid of an oil medium.

Another object of the present invention is to provide a superior recording material, in which a metallic compound and a ligand, colorless or light in color, react quickly with the aid of an oil medium low in cost to form color products which are light, heat and humidity resistant and difficultly oxidized or reduced. The complex of colored material formed through the reaction of the metallic compound and the ligand is dark in color and resistant to light, chemicals, heat and water. The color tone of the colored material being permanent as a result of which the original figure made on the colored material according to the invention can be clearly copied by means of a heat-sensitive or photo-sensitive reproducing device.

A further object of the present invention is to provide a recording material, in which the color reaction rate with a complex is rapid when compared with a conventional color reaction rate, to form a colored material of good color depth.

A still further object of the present invention is to provide a recording material in which color formation is completed within a short time. The color formed is excellent in valuation with a lapse of time, and custody thereof is possible for a long time. Colored handwriting is fast against light, heat, water, and chemicals. The color tone is permanent.

A particular object of the present invention is to provide a recording material useful for copying by means of a heat sensitive and light sensitive reproducing device.

In order to achieve the above-mentioned objects, we have invented a metallosilane compound which is novel as a metallic compound. In other words, they have intended a fact that a recording material can be obtained by using as a color former the metal-losilane compound and a polyhydroxyphenol in combination, achieving the abovementioned objects.

We have also invented it by performing our study is accordance with the above objects, that a recording material achieving the object can be obtained by containing at least one kind of the water-insoluble amine compounds, basic nitrogen compounds and alkylene carbonates in at least one of the metallosilane compounds and the polyhydroxyphenols.

Furthermore, we have found that the abovementioned objects are accomplished by using metallosilane compound and a ligand of polyhydroxyphenols in combination, as color formers of the no-carbon papers and inks.

We have also found that color-formation is more rapidly achieved and handwriting is more clearly made by adding one or more compounds selected from the group consisting of water insoluble amine compounds, basic nitrogen compounds, and alkylene carbonates, into one of said two color formers.

DETAILED DESCRIPTION OF THE INVENTION

The characteristic of the present invention is to use the novel metallosilanes having Si-O metal bond as indicated below, for eliminating the aforementioned disadvantages and accomplishing the objects of the present invention.

The aforementioned metallosilane compounds include polymetallosilane compounds.

The general formulas which represent the metallosilanes of this invention (A) to (D) below:

(A)
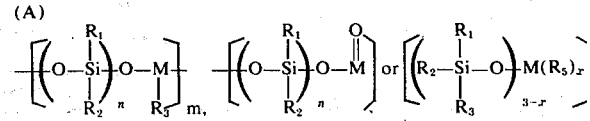

in which, $R_1$, and $R_2$, and $R_3$ : an alkyl radical, an aryl radical, $$-OH \text{ or } -O_{1/2}-$$

$R_5$ : an organic or inorganic acid anion, oxygen, or a ligand such as acetylacetone,
M : a tri-valent metal such as Fe, Bi, or Al,
$m$, and $n$ : 1 to 30
$x$ : 0, 1, or 2

(B)

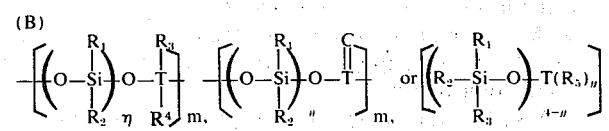

in which, $R_1$, $R_2$, $R_3$ and $R_4$: an alkyl radical, an aryl radical, —OH, or —$O_{1/2}$—
$R_5$: an organic or inorganic acid anion, oxygen, or a ligand such as acetylacetone,
T : a tetra-valent metal such as Ti, Ge, Sn, and Pb,
$m$ and $n$ : 1 to 30
$y$ : 0, 1, 2 or 3

(C)

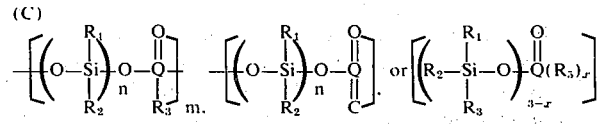

in which, $R_1$, $R_2$ and $R_3$ : an alkyl, an aryl, —OH, or —$O_{1/2}$—
$R_5$ : an organic or inorganic acid anion, oxygen, or a ligand such as acetylacetone,
Q : a penta-valent metal such as V, As, or Sb,
$m$ and $n$ : 1 to 30
$x$ : 0, 1, or 2

(D)

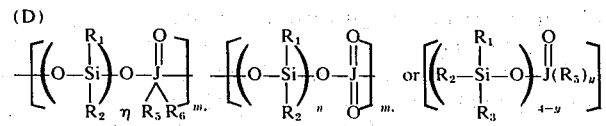

in which, $R_1$, $R_2$, and $R_3$ : an alkyl radical, an aryl radical, —OH, or —$O_{1/2}$—
$R_5$ and $R_6$ : an organic or inorganic acid anion, oxygen, or a ligand such as acetylacetone,
J : a hexa-valent metal such as Mo, W, and Cr,
$m$ and $n$: 1 to 30
$y$ : 0, 1, 2 or 3

Methods of producing metallosilane compounds are indicated as follows:

| organic silane compounds | metallic compounds | | |
|---|---|---|---|
| 1. chlorosilane + $M''X_n$ | alkali+$H_2O$ | → | cohydrolysis process |
| 2. sodium silanolate + $M''X_n$ | | → | condensation process |
| 3. acetoxyorgano silane + $(RO)MR_2$ | | → | heat-condensation process |
| 4. silanol + $M''X_n$ | alkali | → | condensation process by de-hydrogen halides |
| 5. silanol + $M''(OR)_n$ | | → | condensation process by de-alchohol |
| 6. chlorsilane + $M''(RNH_3)_n$ | $H_2O$ | → | co-hydrolysis process |
| 7. chlorsilane + $M_nO_m$ | alkali | → | co-hydrolysis process |
| 8. silanol + $M''O_m$ | | → | condensation process by de-hydration |

(in which,
M : a metal having the valence of 3 to 6
X : a halogen)

The aforementioned metallic compounds used as starting materials are oxides, esters, halides, amides, ammonium salts, alkali metal salts, alkali earth metal salts, complex salts, and chelate compounds.

The aforementioned organic silicons, used for the reaction with the metallic compounds are:

1. monofunctional silanes

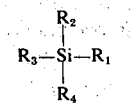

in which, $R_1$ is a halogen atom, $-(-OX$, $-OSiR'^2)_N-OX$ etc. (in which, X is an alkyl radical, an aryl radical, hydrogen, an alkali metal, magnesium, calcium, zinc, mercury, aluminum, etc., and R' is an alkyl, or an aryl, $n$ is one or higher.), and, $R_2$, $R_3$, and, $R_2$, $R_3$ and $R_4$ indicate $-(-O-SiR'^2)_n H$, $-(-O-SiR'^3)$, and a saturated or unsaturated alkyl radical, and an aryl radical having a branch chain (in which, R' is an alkyl or an aryl.).

2. di-functional silanes

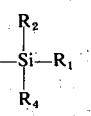

in which, $R_1$ and $R_3$ are a halogen atom, —OX, or —$(-OSiR'^2)_n OX$ (in which, X is an alkyl radical, an aryl radical, hydrogen, an alkali metal, magnesium, calcium, zinc, mercury, or aluminum, R' is an alkyl radical, or an aryl radical, and $n$ is one or higher), $R_2$ and $R_4$ indicate $-(-O - SiR'^2)_n H$, $-(-O - SiR'^3)$, or a saturated or unsaturated alkyl radical and an aryl radial a having branch chain, and R' is an alkyl radical or an aryl radical.

3. tri-functional silanes

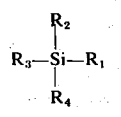

in which, $R_1$, $R_2$, and $R_3$ indicate a halogen atom, —OX, or $-(-O-SiR'^2)_n OX$, (in which X indicates an alkyl radical, an aryl radical, hydrogen, an alkali metal, magnesium, calcium, zinc, mercury, or aluminum, R' is an alkyl radical or an aryl radical), and $R_4$ indicates $-(-O-SiR'^2)_n H$, $-(-O-SiR'^3)$, or, a saturated or unsaturated alkyl radical and an aryl radical having a branch chain (in which R' is an alkyl radical or an aryl radical, and n is one or higher).

In production of the metallosilane compound, the metallic compound and an organic silicon compound as starting materials are blended at a desired mol ratio with a suitable solvent. This method is better in reaction yield and easier in purification of the metallosilane compound thus produced than methods where no sol-

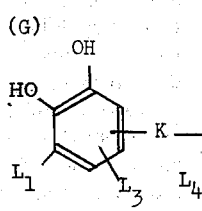 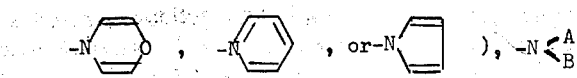 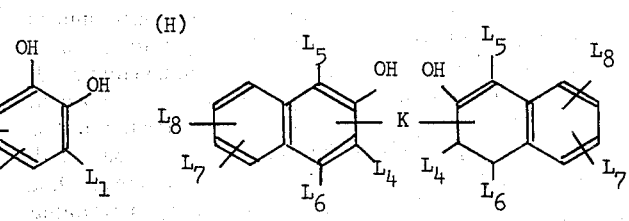

(A and B are H, an alkyl radical, or an aryl radical), or —NHCOX (X is an alkyl radical or an aryl radical).

(G) (H)

vent is used. As the solvent for this reaction, ethyl acetate, acetone, methyl ethyl ketone, ethanol, chloroform, carbon tetra chloride and benzene which are relatively low in boiling point, or chlorinated diphenyl, dibutyl phthalate, oleyl alcohol, phenyl cellosolve, dimethyl sulfoxide and dimethyl formamide which are high in boiling point, or solvents made by mixing said low and high boiling point solvents can be employed.

In addition, the reaction temperature and the reaction time are properly selected depending on the use of the metallosilane compound. However, it is preferable to make the reaction temperature 200°C or lower, because the produced metallosilane compound is colorless and therefore may be used in a wide range of application. Furthermore, the reaction time ranges from 1 hour to 70 hours, but is dependent upon the reaction temperature. In the reaction, acid and alkali may be added in order to adjust the reaction liquid in pH and a proper catalyzer may be added in order to promote the reaction.

The metallosilane compounds obtained as mentioned above have advantages that they are colorless or light in color, are not decomposed and colored by the effects of air, temperature, light and humidity, are soluble in an organic solvent, are hardly decomposed within a pH region from 3 to 10, and are stable.

It is one of the specific features of the present invention that at least one of the polyhydroxyphenols having two phenolic hydroxyls or more at an adjacent position as shown by the following general formulas is as the ligand used in the combination with the metallosilane compound in color reaction.

General formula of polyhydroxyphenol (E) (F)

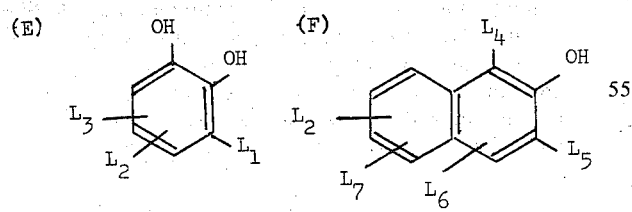

in which; $L_1$, $L_4$, and $L_5$: H, OH, an alkyl radical, an aryl radical, or an acyl radical (either $L_4$ or $L_5$ must be OH); $L_2$, $L_3$, $L_6$, $L_7$, and $L_8$: an alkyl radical, an aryl radical, an acyl radical, —$SO_3M$ (M is a metallic cation, such as —$Ca_{1/2}$, —$Ba_{1/2}$, —$Sr_{1/2}$, or a primary amine to a quarternary amine), —COY (Y is H, an alkyl radical, an aryl radical, or a primary amine to a quarternary amine), sulfonic acid amide, amine sulfate, carboxylic acid amide, amine carbonate, —$CH_2Z$ (X is wherein each of $L_1$, $L_4$ and $L_5$ are individually selected from the group consisting of H, —OH, alkyl, aryl or acyl radicals with either $L_4$ or $L_5$ being H; and $L_2$, $L_3$, $L_6$, $L_7$, and $L_8$ are individually selected from the group consisting of H, —OH, —CHO, —$NO_2$, $NH_2$, alkyl, aryl, acyl, —$SO_3M$ (M is selected from the group of cations incuding, —$Ca_{1/2}$, —$Ba_{1/2}$, and —$Sr_{1/2}$, and primary to quaternary amines,), a COY (Y is selected from the group of H, alkyl radicals aryl radicals, and primary to quarternary amines) sulfonic acid amide, amine sulfonate, carboxylic acid amide, amine carbonate, —$CH_2Z$ (Z is

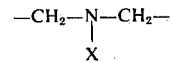

(X is alkyl, or aryl, A and B are H, alkyl, or aryl radicals); and K is selected from the group consisting of —, —O—, —$SO_2$—, —N=N—, —$(CH_2)_x$— (x is an integer of 1 to 10), and $$-CH_2-\underset{X}{N}-CH_2-$$

(X is H, alkyl, or aryl radicals).

In conclusion, the specific features of the present invention reside in utilization of the above-described novel metallosilane compounds produced by introducing

into metal complexes and in utilization of said metallosilane compounds in combination with the above-mentioned polyhydroxyphenols, as a result of which excellent recording materials can be obtained conforming to the objects of the present invention.

Furthermore, if at least one of the water-insoluble amine compounds, basic nitrogen compounds, and alkylene carbonates, is contained in either or both of the metallosilane compound and polyhydroxyphenols, it promotes formation of complexes between the metallosilane compounds and the polyhydroxyphenols thereby improving both the color reaction rate and the color depth of the material. The term "water-insoluble amine" used herein is an amine which has at least seven carbons, and may be an amine which is slightly soluble or insoluble in water under the condition of free amine. The amine includes primary amines, such as 2-ethylhexylamine, laury amine, stearyl amine, Amberlite XLA-3 (produced by Organo Co., Japan, trade mark of primary amine), and Plimene JMT (produced by Organo Co., Japan, primary amine), secondary amines, such as dibutylamine, dicyclohexylamine, bis-2-ethylhexylamine, di-stearylamine, dibenzylamine, diphenylamine, Amberlite LA-1 (produced by Organo Co., Japan trade mark of secondary amine), and Amberlite LA-2 (produced by Organo Co., Japan trade mark of secondary amine), and tertiary amines such as dimethyllaurylamine, trioctylamine, tribenzylamine, and triphenylamine.

The basic nitrogen compounds are selectively determined from the following general formulas:

Examples of the ligands (polyhydroxyphenols) to be used:

gallic acid, protocatechuic acid, 1,2-dihydroxynaphthalene-3,6-dicarboxylic acid, 2,3-dihydroxynaphthalene-6-carboxylic acid, alcohol esters of gallic acid, protocatechuic acid, 1,2-dihydroxynaphthalene-3,6-dicarboxylic acid, and 2,3-dihydroxynaphthalane-6-carboxylic acid, (propyl, amyl, octyl, lauryl, stearyl, benzyl, phenylethyl, cinnamyl, cyclohexylalcohol, and the like), amine salts of gallic acid, protocatechuic acid, 1,2-dihydroxynaphthalene-3,6-dicarboxylic acid, and 2,3-dihydroxy naphthalene -6-carboxylic acid, (aniline, 2-ethyl hexyl amine, octylamine, lauryl amine, stearyl amine, dibenzyl amine, diphenyl amine, dioctyl amine, tetramethyl ammonium, trioctylmonomethyl ammonium, lauryl trimethyl ammonium, stearyl trimethyl ammonium, distearyl dimethyl ammonium, lauryl picolinium, and the like, as amines), amides of gallic acid, protocatecheuic acid, 1,2-dihydroxynaphthalene-

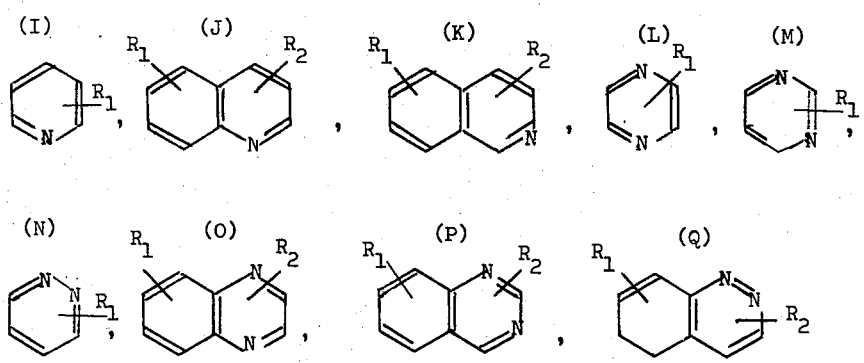

where, $R_1$ and $R_2$ are H, —OH, an alkyl radical, an aryl radical or an acryl radical.

The alkylene carbonates are compounds shown by the following general formula:

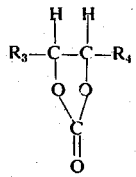

where; $R_3$ and $R_4$ are a hydrogen atom, an alkyl radical or an aryl radical.

Preferably, the oil mediums used in the present invention are negative or low in volatility, which include, for instance, mineral oils, animal oils, vegetable oils, alcohols such as oleyl alcohol, phenylethylalcohol, and glycerin, organic acids such as naphthenic acid, and oleis acid, esters such as benzylbenzoate, dioctylphthalate, dibuthylphthalate, and tricresylphosphate, ethers such as phenylcellosolve, benzylcarbitol, and polypropyleneglycol monoether, hydrocarbons such as decalin, solvent naptha, alkylbenzenes, alkylenebiphenyls, heavy alkanes, heavy alkenes, halogenated hydrocarbons such as chlorinated diphenyl, and chlorinated paraffin, and silicon oils such as dimethylsilicon oil, and methyl phenyl silicon oil. These oil mediums are used independently or mixed for putting them in use.

Now, exemplified below are the combinations of the polyhydroxyphenols used in the present prevention and the various typical metallosilane compounds, and also the colors of the color materials resulting from the reaction between two color formers:

3,6-dicarboxylic acid, and 2,3-dihydroxy naphtalene-6-carboxylic acid (aniline, 2-ethylhexyamine, octyl amine, lauryl amine, stearyl amine and the like as amines of amides), amides of 2,3-dihydroxynaphthalene-6-sulfonic acid, 1,2-dihydroxynaphthalene-3,6-disulfonic acid, 1,2-dihydroxynaphthalene-6-methylene sulfonic acid, and 1,2-dihydroxybenzene-4-sulfonic and (aniline, 2-ethyl hexyl amine, octylamine, lauryl amine, stearyl amine and the like as amines of amides), amines and metallic salts of 2,3-dihydroxynaphthalene-6-sulfonic acid, 1,2-dihydroxynaphthalene-3,6-disulfonic acid, 1,2-dihydroxynaphthalene-6-methyl sulfonic acid, and 1,2-dihydroxybenzene-4-sulfonic acid (aniline, 2-ethylhexylamine, octylamine, lauryl amine, stearyl amine, dibenzylamine, diphenylamine, dioctylamine, tetramethyl ammonium, trioctylmonomethyl ammonium, lauryl trimethyl ammonium, stearyl trimethyl ammonium, distearyl dimethyl ammonium, lauryl picolinium and the like, as amines, and sodium, calcium, barium, strontium and the like, as metal).

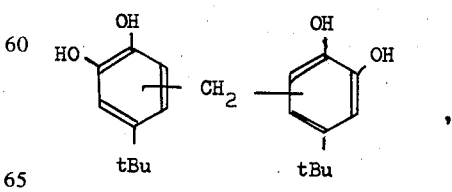

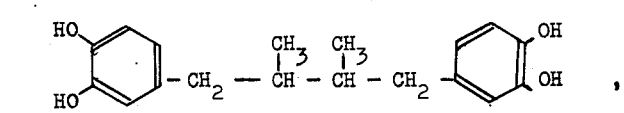

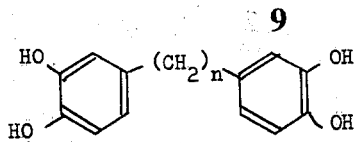 (n = 6 or 9) ,
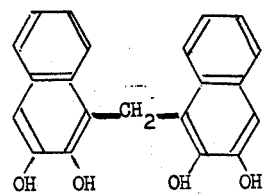 , 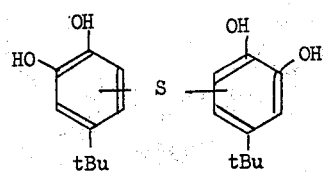 ,
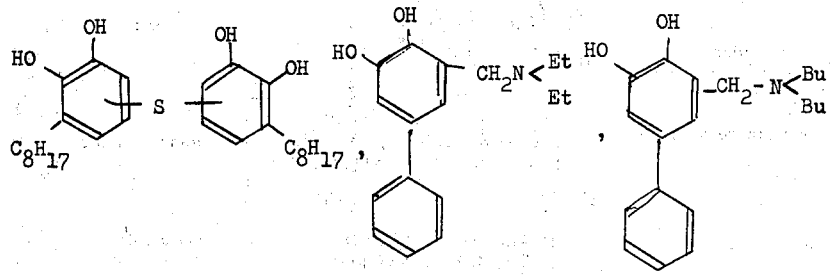 ,
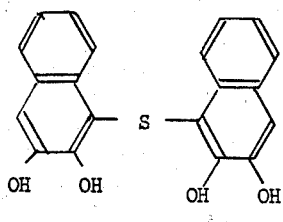 ,
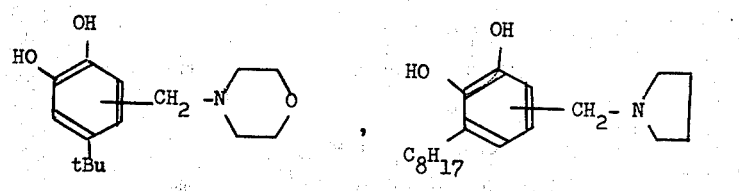 ,
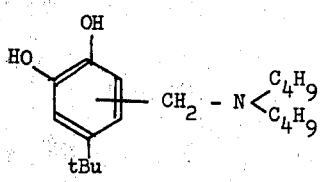 , 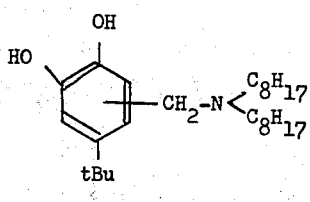 ,
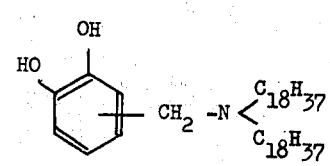 ,
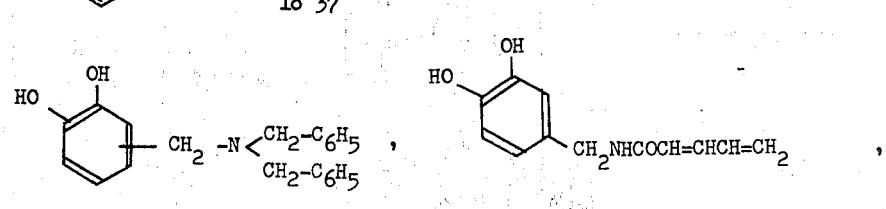 ,

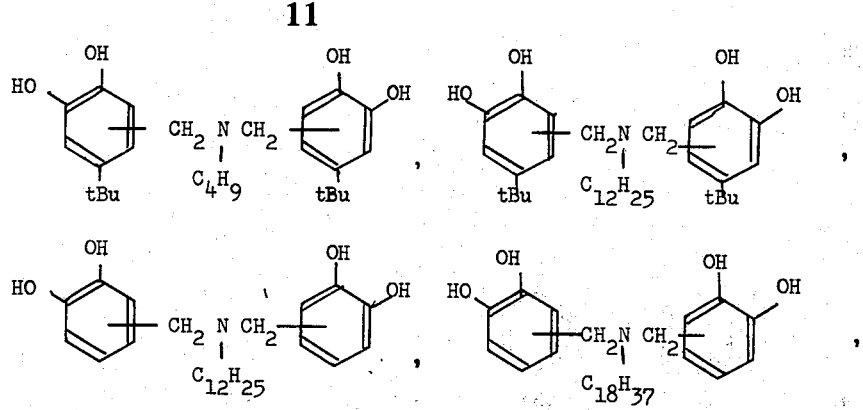

Examples of the metallic compounds (metalosilane) used in combination with the above-mentioned polyhydroxyphenols and the colors of the color materials are as follows:

| metallic compound | coloration |
|---|---|
| $\left[\left(O-\underset{\underset{C_6H_5}{|}}{\overset{\overset{C_6H_5}{|}}{Si}}\right)_n O-Bi\right]$    n=1-6 | yellow-orange color |
| $\left[\left(O-\underset{\underset{OH}{|}}{\overset{\overset{C_6H_5}{|}}{Si}}\right)_n O-Bi\right]_{1/2}$    n=1-8 | yellow-orange color |
| $\left(CH-\underset{\underset{C_6H_5}{|}}{Si}-O\right)_3 Bi$ | yellow-orange color |
| $\left[\left(O-\underset{\underset{OH}{|}}{\overset{\overset{C_6H_5}{|}}{Si}}\right)_n O-Fe\right]_{1/2}$    n=2-16 | violet-black color |
| $\left[\left(O-\underset{\underset{C_6H_5}{|}}{\overset{\overset{C_6H_5}{|}}{Si}}\right)_n O-Fe\right]_{1/2}$    n=2-16 | violet-black color |
| $\left[\left(O-\underset{\underset{CH_3}{|}}{\overset{\overset{C_6H_5}{|}}{Si}}\right)_n O-Fe\right]_{1/2}$    n=2-16 | violet-black color |
| $\left(C_6H_5-\underset{\underset{C_6H_5}{|}}{Si}-O\right)_3 Fe$ | violet-black color |
| $\left[\left(O-\underset{\underset{OH}{|}}{\overset{\overset{C_6H_5}{|}}{Si}}\right)_n O-Ti\right]$    n=2-10 | orange to red color |
| $\left[\left(O-\underset{\underset{CH_3}{|}}{\overset{\overset{CH_3}{|}}{Si}}\right)_n O-Ti\right]$    n=1-8 | orange to red color |
| $\left[\left(O-\underset{\underset{O_{1/2}}{|}}{\overset{\overset{CH_3}{|}}{Si}}\right)_n O-Ti\right]$    n=1-8 | orange to red color |

-Continued

| metallic compound | coloration |
|---|---|
| $\left(C_6H_5-\underset{\underset{C_6H_5}{|}}{\overset{\overset{C_6H_5}{|}}{Si}}-O\right)_4 Ti$ | orange to red color |
| $\left[\left(O-\underset{\underset{CH_3}{|}}{\overset{\overset{C_6H_5}{|}}{Si}}-TiO\right)_m \left(\underset{\underset{CH_3}{|}}{\overset{\overset{O-C}{||}}{O=C}}CH\right)_2\right]$ | orange to red color |
| $[(CH_3(C_6H_5)_2SiO)_2VO]_2O$ | black color |
| $[((CH_3)_2C_6H_5SiO)_2VO]_2O$ | black color |
| $[((C_6H_5)_3SiO)_2VO]_2O$ | black color |
| $\left[\left(O-\underset{\underset{C_6H_5}{|}}{\overset{\overset{C_6H_5}{|}}{Si}}\right)_n O-V\right]_{1/2}$    n=2-10 | black color |
| $\left[O-\left(\underset{\underset{CH_3}{|}}{\overset{\overset{C_6H_5}{|}}{Si}}\right)_n O-V\right]_{1/2}$    n=1.5-10 | black color |
| $CH_3-\underset{\underset{C_6H_5}{|}}{\overset{\overset{C_6H_5}{|}}{Si}}-O-V=O$ | black color |
| $\left[CH_3-\underset{\underset{C_6H_5}{|}}{\overset{\overset{C_6H_5}{|}}{Si}}-O-\underset{\underset{O_{1/2}}{|}}{\overset{\overset{O}{||}}{V}}-O-\underset{\underset{C_6H_5}{|}}{\overset{\overset{C_6H_5}{|}}{Si}}-CH_3\right]_2$ | black color |
| $\left(CH_3-\underset{\underset{C_6H_5}{|}}{\overset{\overset{C_6H_5}{|}}{Si}}-O\right)_3 V=O$ | black color |
| $\left(C_6H_5-\underset{\underset{C_6H_5}{|}}{\overset{\overset{C_6H_5}{|}}{Si}}-O\right)_3 V=O$ | black color |
| $\left[\left(O-\underset{\underset{C_6H_5}{|}}{\overset{\overset{C_6H_5}{|}}{Si}}\right)_n O-V\right]$    n=1-10 | black color |
| $\left[\left(O-\underset{\underset{CH_3}{|}}{\overset{\overset{CH_3}{|}}{Si}}\right)_n O-Mo\right]$    n=2-8 | orange-brown to blue-black color |
| $\left[\left(O-\underset{\underset{OH}{|}}{\overset{\overset{C_6H_5}{|}}{Si}}\right)_n O-Mo\right]$    n=2-8 | orange-brown to blue-black color |

| metallic compound | -Continued coloration |
|---|---|
| 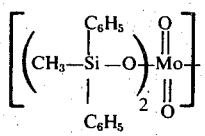 | orange-brown to blue- |

EMBODIMENT 1

A capsule-type recording material, the no-carbon paper of the present invention is provided by the color reaction occurred through the combination of color formers of metallosilane compounds and polyhydroxyphenols, or the combination of the abovementioned color formers with one or more compounds selected from the group consisting of water insoluble amines, basic nitrogen compounds and alkylene carbonates, in at least one of the color formers.

This capsule-type recording material is obtained by coating on one surface of substrate, a microcapsulated solution produced by dissolving one of the abovementioned color formers (metallosilane compound or polyhydroxyphenol) into an oil medium, and a solution or a microcapsulated solution produced by dissolving another one of said color formers into an oil medium.

The aforementioned recording mateiral is also obtained by holding at least one compound selected from the group consisting of water insoluble amines, basic nitrogen compounds, and alkylene carbonates on at least one surface of substrates having the color formers, with another process which comprises adding the compound into the microcapsules in which a solution of one of the color formers is enclosed, or mixing the same with the abovementioned microcapsules, or mixing the same with color formers which are not encapsulated.

The micro-encapsulation of the solution of the color formers, used in the present invention is made by the process properly selected from the known processes, such as, coacervation process, intersurface reaction process, phase separation process, physical process, and the like, in accordance with the properties of no-carbon papers to be used. When one of said color formers is encapsulated, another one is dissolved or dispersed in a suitable medium, and each of them is coated on a same or different substrate.

The two kinds of the color formers may be simultaneously coated on the same surface of a paper as a mixture thereof.

When each of two solutions obtained by independently dissolving each of said two color formers is encapsulated respectively, said two kinds of microcapsules are separately or in the state of a mixture coated on the same or different surfaces of the substrate.

In the present invention, the following compounds may be added into one or both of said color formers to improve the various characteristics of the no-carbon paper of the present invention.

Said compounds to be added are as follows. Sulfur compounds, such as, thio-urea, diphenyl thio-urea, di-o-tolyl thio-urea, trimethyl thio-urea, 2-mercapto imidazoline, mercapto benzoimidazol, mercapto and benzothiazol, and adidic compounds, such as tartaric acid, citric acid, and phosphoric acid. These are used as antioxidants of the polyhydroxyphenols.

Furthermore, when present invention is a pressure sensitive copying paper, it is preferable that additional white fine powders, such as silicon dioxide, titanium dioxide, talc, aluminum oxide, calcium carbonate, and clay, are coated on the surface of the substrate, to form very porous and matte layer, to increase the colour intensity of the pressure image by several times, and to increase the whiteness of the surface of the substrate.

Fluorecent whiteners may be added to increase the whiteness of the material of the present invention. Natural or synthetic high molecular materials are preferably used in the coating to provide strong binding to the substrate.

The preferable binders to be used, are water soluble high molecular materials, such as dextrin, polyvinyl alcohol, and gelatine, high molecular materials soluble in organic solvents, such as, polyvinyl resins, polyacrylic resins, silicon resins and polystyrene resins, and high molecular latex solution.

Furthermore, the coating may be made, if required, with the addition of stabilizers, such as ultraviolet absorbers, antioxydants, and reductant, to provide permanence of handwritings or other pressure sensitive images and to increase the stability of the color formers coated on the substrate.

The substrates used in the present invention are papers, synthetic papers, plastic film sheets and the like.

EMBODIMENT 2

This is a recording material in which, the combination of two color formers, namely, the metallosilane compound and the polyhydroxyphenol, or of said two color formers one of which includes at least one kind of the non-aqueous amine compounds, basic nitrogen compounds and alkylene carbonates, one of the two color formers is coated on a substrate while the other is used as a colorless ink in a liquid or paste state, or the colorless ink is impregnated in a porous substrate.

The concrete examples of using said recording material are as follows:

a. For recording with a pen or an oscillograph the data from an industrial instrument, a medical apparatus, or other measuring instruments, a recording material is formed as follows: one of the color formers which is dissolved or dispersed in a medium, is coated on a substrate such a paper while the other, an ink, in the form of a liquid or a paste is enclosed in a proper recording member and is contacted with the former one. The paper and the ink thus coated thereon is vary stable, whereby at the moment the ink (which contains one of the color former) flowing out recording member comes in contact with the other color former coated on the substrate, the image of superior coloration is obtained.

b. One of the color formers is coated on a substrate such as a paper while the other is made as an ink in the state of a liuqid or a paste. The ink is used for a ball-point pen or a writing pen. The thus coated substrate and the thus treated pen are combined by contact to produce the handwriting. The thus coated paper and the ink is so stable that, as soon as the ink flowing out of the sign-pen or ball-point pen comes in contact with the substrate coated with one of the color formers, fine coloration can be effected as mentioned above.

c. One of the color formers is coated on a substrate such as a paper while the other is made into an ink in the forms of a liquid or a paste. The ink is used as a printing ink for the relief printing, intaglio printing, or flat printing which employs metal printing plates. The ink on contact with the substrate coated with the color former forms a recording material which produces fine printed figures. The coated paper and the ink are stable, thereby to produce splended coloration.

d. One of the color formers is coated on a substrate while the other is made into an ink in the form of a liquid or a paste. The ink thus made is impregnated in a porous material such as a ribbon, a paper or a porous film. The thus ink-impregnated porous material is positioned opposite to the substrate coated with the color former, and the color former impregnated in the porous material is transferred onto the substrate by the typing pressure of a typewriter, thereby to form letters on the substrate. The paper coated with the color former and the porous material impregnated with the color former are so stable that fine coloration is obtained.

In addition to the above-described concrete examples, any combination or construction is available in which one of the color formers is coated on a substrate or a base material while the other color former is made into an ink in the form of a liquid or a paste, and the ink and the thus coated substrate or base material are combined thereby to produce typed, printed or handwritten letters images or figures.

With respect to the abovementioned examples (a) through (d), in coating one of the color formers on the substrate, the coated layer may be formed by adding white powder, a binder, an ultraviolet absorber, an antioxidant and a stabilizer into the color former. The other color former (used in combination with the firstly mentioned color formers coated on the substrate) is dissolved in an oil medium thereby to prepare an ink in the form of a liquid or a paste depending on its use. The ink thus dissolved in the oil medium may be dispersed in water thereby to prepare an emulsion type ink.

With respect to the above-described examples (a) through (d), the inks should be prepared with attention to the followings:

First of all, in case of (a) and (b) the ink should be formulated so that the ink flows smoothly from the pen member without drying even if the ink is left in the pen for a long time. For this purpose, the viscosity and surface tension of the ink should be adjusted by adding a surface active agent and a resin to the ink. According to the uses of the ink, the ink may be prepared by properly selectively adding a stabilizer and an agent used for preventing ink-blotting.

In case of (c), it is preferable to add a resin and a surface active agent to the ink so that the ink is smoothly coated on a printing plate thereby to obtain clear printed figures.

In case of (d), one of the color formers is impregnated into the porous material such as a sponge and a cloth, as described above. Therefore, it is required that the ink have a suitable viscosity and surface tension without drying and without making the other base material dirty, and has characteristics that it spreads into the porous material and is high in durability. In order to meet these requirements in production of a satisfactory ink, it is usually necessary to add a resin, a surface active agent, a filler as viscosity-former and an stabilizers into the ink.

The thus obtained recording material is stable for a long time. Further, it is very quick in color development rate and high in color depth in the recording operation. Therefore, the present invention provides the recording material which produces clear and strong printed or handwritten figures. Furthermore, in connection this, the present invention provides a recording material having another specific feature that hands, clothes, machines and substrates are seldom made dirty by the produced letters or figures during a recording operation. The letters or figures are indelible and thus cannot be readily corrected nor revised because handwritten or typed or printed figures, which are strong and high in contrast, can be obtained from combination of the metallosilane compound and the polyhydroxyphenol, both being light in color. These characteristics have not been found in the case where handwriting, printing, recording or typewriting is conducted by using conventional color ink or conventional pigment ink, or by using a cloth, a sponge or a film which is impregnated with said ink.

Now, the present invention will be further described with reference to other embodiments thereof.

The term "part" as used herein means "part by weight" in the following examples:

EXAMPLE 1

First, 19 parts of phenyl methyl dichloro silane, 20 parts of ammonium molybdate and 100 parts of butyl acetate are put in a 300 ml three-neck distillation flask. The thus obtained solution is stir-red while air of relative humidity 50 to 90 % is supplied thereto, and then the solution is reacted for 60 hours while heated at a temperature of 90° to 100°C. After completion of the reaction, the solution is washed alternatively with 3 % sodium bicarbonate aqueous solution and 3 % sulfuric acid aqueous solution, and is washed with water so that pH of the solution be neutral at last. Then, the butyl acetate is removed by distillation thereby to obtain 18 parts of white solid polymolybdo silane compound

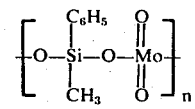

whose molecular weight is about 7,000. (n is an integer sufficient to provide the indicated molecular weight.) Then, three parts of the thus obtained

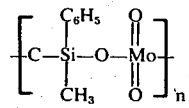

compound is resolved in 20 parts of trichloro diphenyl, and then 3 parts of benzoyl chloride is added to the thus obtained solution. Furthermore, the thus prepared solution is dropped into 100 parts of 5 % "Gosenol" GM-14 (trade mark of a polyvinyl alcohol made by the Nippon Gosei Kabushiki Kaisha) thereby to be dispersed therein in the form of minute drops with the result of emulsion. Next, 10 parts of 10 % sodium hydroxide aqueous solution is dropped into the thus emulsified solution, and the thus treated solution is stirred at a temperature of 30°C for about 1 hour, as a result of which the benzoyl chloride is reacted with the polyvinyl alcohol whereby water-insoluble polymers are produced on interfaces between the trichloro diphenyl and the water thereby producing capsule-suspension which capsule encloses a color former, namely, a trichloro diphenyl solution. The thus produced capsule-suspension is coated on a sheet as it is, and then the sheet is dried.

For the other component, a solution consisting of 3 parts of bis-methylene-(2,3-dihydroxy naphthalene)

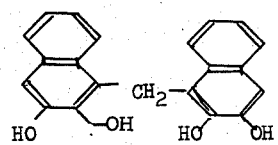

and 20 parts of dioctyl phthalate is adjusted with hydrochloric acid into pH 3.2. The thus adjusted solution is dropped into a solution consisting of 5 parts of "Yurashin P-1500" (which is the trade mark of a cation dimethylol urea amine modified resin, made by Mitsui Toatsu Co., Ltd.) and 50 parts of water thereby to obtain an emulsified solution thereof. The thus treated solution is stirred at a solution temperature of 90°C for 3 hours and then the solution temperature is reduced to 40°C. Furthermore, the solution is stirred for about one hour while being added with 20 ml of pH 1.0 hydrochloric acid, as a result of which the Yurashin P-1500 causes bridging or cross-linking thereby becoming a polymer having a three-dimensional molecule construction. The thus obtained polymer is insoluble in water, and deposits therefore on the outer surfaces of minute drops of dioctyl phthalate which has dissolved a color former therein, thereby to form micro-capsules which enclose the color former, namely, dioctylphthalate solution. Polyvinyl alcohol is added into the micro-capsule suspension and another sheet is coated with the thus treated micro-capsule suspension and then dried.

The thus obtained two different sheets have, their coated surfaces juxtaposed. When the thus positioned sheets are applied with a writing pressure or a typewriting pressure, it produces brown letters on the white background of the sheet. Thus, a pressure-sensitive copying sheet stable with a lapse of time was produced.

EXAMPLE 2

150 parts of toluene, 25 parts of diphenyl dichloro silane, 14 parts of ammonium metavanadate and 4 parts of sodium bicarbonate are put into a three-neck distillation flask of 300 ml. The thus obtained dispersion solution is stirred at a temperature of 100° ± 5°C for 8 hours while being introduced with a nitrogen gas of relative humidity 40 to 90 % at a rate of 5 to 20 ml per minute. After completion of the reaction, the toluene and the diphenyl dichloro silane are removed through vacuum distillation, and then washed with 3 % sodium bicarbonate, as a result of which 20 parts of white, solid polyvanado siloxane compound having the following formula, whose molecule weight is about 2,500, is obtained.

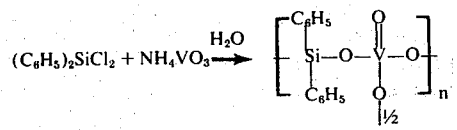

where: $n = 8$ to $10$.

According to an infrared ray absorption spectrum, there are the following combinations in the thus obtained polyvanado siloxane compound:

$V - O - Si$ combination, about $920$ cm$^{-1}$
$V = O$ combination about $1110$ cm$^{-1}$
$C_6H_5 - Si$ combination about $1425$ cm$^{-1}$, $1095$ cm$^{-1}$ Furthermore, as a result of an elementary analysis, a ratio of Si to V is from 1:1 to 1:1.2. It is found by an ebullioscopic method that the moelecular weight of the obtained polyvanado siloxane compound is from 2,000 to 2,600. Then, a solution which contains 3 parts of polyvanado siloxane, 0.4 part of "Tinuvin 326" (which is the trade mark of an ultra-violet absorber made by Geigy Co. in Switzerland), 2 parts of trioctylamine, 17 parts of dibutyl phthalate and 2 parts of "Coronate L-75" (the trade mark of a polyisocyanate made by Nippon Polyurethane Co., Japan), is added to a solution containing 2 parts of "Gosenol GM-14" (polyvinyl alcohol made by Nippon Gosei Kagaku Co.) and 38 parts of water is emulsified by stirring so that a particle thereof be 4 to 5 μ in size. Furthermore, into the thus obtained solution, a solution prepared by dissolving 2 parts of "Epicure U" (the trade mark of the amine additive of epoxy resin) into 20 parts of water is dropped, while the former solution is stirred for three hours. As a result micro capsules enclosing the dibutyl phthalate of polyvanado siloxane are produced. To the thus produced capsule-suspension, 4 parts of 400-mesh cellulose powder, 4 parts of Naugatex SN-304 (the trade mark a latex solution of carboxy modified polystyrene butadiene rubber, made by Sumitomo Kagaku Co., Ltd., Japan), 9 parts of gelatin aqueous solution and 9 parts of 5% methyl cellulose aqueous solution are added, and then the thus obtained solution is made by addition of phosphoric acid to be 5.5 in pH. Then, a sheet is coated with the thus treated solution and is dried.

On the other hand, a dispersion solution containing the following ingredients is well mixed and coated on another sheet which is then dried.

| | | |
|---|---|---|
| Tricapryl ammonium salt of protocatecuic Acid | 3 | parts |
| Citric acid | 0.5 | part |
| Phthalic acid | 1 | part |
| Thiourea | 5 | parts |
| fine powdered silica | 15 | parts |
| Ethoxy cellulose resin | 7 | parts |

The thus obtained two different sheets are positioned so that the coated surfaces thereof face to each other. When the thus piled sheets are compressed by handwriting or typewriting pressure, black letters appear on a white background thereof. Thus, pressure sensitive copying sheets stable with a lapse of time can be obtained.

EXAMPLE 3

40 parts of diphenyl methyl silanol, 18 parts of vanadium pentaoxide, 300 parts of toluene and 1 part of lead laurate as a catalyzer are charged into a 500-ml flask, and these are heated at a temperature of 100° to 110°C thereby to cause the reflux of toluene. At the same time, water produced through the reaction is removed. After the reaction has been thus effected for 15 hours, the toluene is removed by distillation, as a result of which 51 parts of light-brown viscous vanado siloxane shown by the following formula, is obtained.

$[(CH_3(C_6H_5)_2SiO)_2VO]_2O$

Three parts of the thus obtained vanado siloxane in place of the vanadosiloxane in Example 2 is treated in the same way as in Example 2 thereby producing capsule-suspension. The capsule-suspension is coated on a sheet which is dried later.

On the other hand, a solution containing the following ingredients is well mixed and dispersed, and the thus treated solution is coated on another sheet.

| | |
|---|---|
| Lauryl gallate | 50 parts |
| Methanol | 200 parts |
| "Demol N" (the trade mark of an enion surface active agent made by Kao Sekken Co., Ltd., Japan) | 12 parts |
| Phosphoric acid | 20 parts |
| Thiourea | 50 parts |
| Hardsil clay (made by Tsuchiya Co., Japan, $SiO_2$ 80%, $Al_2O_3$ 10%, residue 10%) | 300 parts |
| fine powdered silica | 300 parts |
| Polyvinyl alcohol | 60 parts |
| Water | 1340 parts |
| Naugatex SN-304 (refer to Example 2) | 124 parts |
| S-FW (the trade mark of fluorescent brightening agent, made by Shinroihi Co., Ltd., Japan) | 3 parts |

Then, the thus obtained two different sheets are piled, in such a manner that their coated surfaces be faced to each other. When a handwriting or typewriting pressure is inparted on the thus piled sheets, black letters are clearly produced on a white background of the sheet. Therefore, pressure-sensitive copying sheets are obtained which are stable permanently.

EXAMPLE 4

45 parts of sodium triphenyl silanolate, 8 parts of anhydrous ferric chloride and 200 parts of toluene are put into a 500 ml flask, and these are reacted for 15 hours while being heated and stirred. After completion of the reaction, the solution thus obtained is washed with water and then benzene is removed, as a result of which ferriphenyl silane

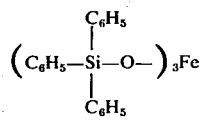

is obtained.

Then, 30 parts of the thus obtained ferriphenyl silane is dissolved in 20 parts of dioctyl phthalate. Then, through the same operation or treatment as found in Example 1 in which the metallo silane is capsulated, capsule-suspension whose capsules enclose the ferriphenyl silane solution therein is produced. The thus obtained capsule-suspension is coated on a sheet which is dried later.

On the other hand, a solution containing the following ingredients is mixed and dispersed, and the thus treated solution is coated on another sheet which is also dried later.

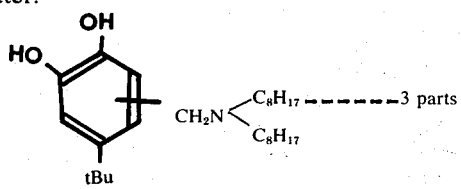

| | | |
|---|---|---|
| Citric acid | 0.5 | part |
| Phthalic acid | 5 | parts |
| Trimethyl thiourea | 3 | parts |
| Ethylene carbonate | 1 | part |
| Fine powdered silica | 25 | parts |
| Polyvinyl acetate | 10 | parts |
| Methanol | 100 | parts |

Then, the thus obtained two different sheets are placed one on the other in such a manner that their coated surfaces come in contact with each other. When a handwriting or typewriting pressure is imparted on the thus placed sheets, violet-black letters are clearly produced on a white background thereof. Thus, pressure-sensitive copying sheets are obtained which are stable against variation with a lapse of time.

EXAMPLE 5

18 parts of mono-sodium salt of phenyl silane triol, 17 parts of anhydrous ferric chloride and 100 parts of toluene are put in a three-neck distillation flask of 300 ml, and these are heated at a temperature of 100° to 120°C to the extent that the toluene causes reflux and are then left as they are for 3 hours. The reaction is further continued for 5 hours while nitrogen gas, which is 50% in relative humidity, being added thereto at a rate of 30 to 50 ml per minute. After completion of the reaction, the solution obtained through the reaction is washed alternatively with 3% sodium bicarbonate aqueous solution and 3% sulfuric acid aqueous solution whereby the solution is made neutral. Therefore, when the toluene is removed by distillation, 20 parts of light-brown solid-state polyferri silane compound

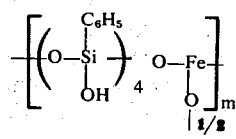

whose molecule weight is about 3,500, is produced. (n is an integer sufficient to provide the indicated molecular weight.)

Four parts of polyferri silane, 0.5 part of benzyl pyridine and 20 parts of dibutyl phthalate are dissolved. Then, the thus obtained solution is dropped into a solution which is prepared by dissolving 5 parts of gum arabic in 40 parts of water, thereby to obtain a emulsified solution. Furthermore, a solution prepared by adding 5 parts of pH 8 gelatin into 40 parts of water is added to the thus emulsified solution. The thus treated solution is stirred for a while, and is then made to pH 5 by addition of 20% sodium hydroxide aqueous solution. After this treatment, the solution is gradually made to pH 4.4 by addition of 10% acedic acid aqueous solution while 125 parts of water being added thereto. As a result of the above treatment, a composite colloid deposits around a drop of color former, or dibutyl phthalate solution thereby producing a coating around the mixtures. The above-mentioned treatment are conducted at a temperature of 50°C. Then, one part of 37% formaldehyde is dropped in the abovementioned solution having mixtures at a slow rate and the mixture is gelatinized by lowering the temperature of the solution at a rate of 10°C per 30 minute, while being stirred. After this, the solution is made 9 in pH by addition of 20% sodium hydroxide and the capsulation process is thus completed thereby to obtain capsule-suspension. The thus obtained capsule-suspension is added with 4 parts of polyvinyl alcohol. The thus prepared solution is coated on a sheet which is dried later.

On the other hand, a solution containing the following ingredients is mixed and dispersed, and the thus treated solution is coated on another sheet.

$$\left(\begin{array}{c}HO\\HO\end{array}\diagdown\!\!\!\!\bigcirc\!\!\!-CH_2-CH-\\CH_3\end{array}\right)_2 \quad \text{5 parts}$$

| | | |
|---|---|---|
| Tartaric acid | 0.5 | part |
| Di-o-tolylthiourea | 3 | parts |
| Fine powdered silica | 40 | parts |
| Ethoxy cellulose resin | 15 | parts |
| Methanol | 120 | parts |

The thus obtained two different sheets are put one on the other in such a way that their coated surfaces are faced to each other. When a handwriting or typewriting pressure is imparted to the sheets, violet-black letters are clearly formed on a white background thereof. Thus, pressure-sensitive copying sheets are obtained which are stable against variation with a lapse of time.

EXAMPLE 6

25 parts of diphenyl dichloro silane, 13 parts of ammonium netavanadate and 100 parts of benzene are put into a three-neck distillation flask of 300 ml, and these are heated at a temperature of 80° to 90°C to reflux. At the same time as the heating operation, nitrogen gas which is 50 to 90% in relative humidity is added into the flask at a rate of 20 to 30 ml per minute and the reaction is continued for 10 hours. Then, the contents in the flask is washed alternatively with 3% sodium bicarbonate aqueous solution and 3% sulfuric acid aqueous solution and is then washed with water till the solution becomes neutral. Then, the benzene is removed through distillation, as a result of which 18 parts of white and solid polyvanado silane $$\left[\left(-O-\underset{\underset{C_6H_5}{|}}{\overset{\overset{C_6H_5}{|}}{Si}}-O\right)_4-\underset{\underset{O_{1/2}}{|}}{\overset{\overset{O}{\|}}{V}}\right]_m$$

where molecular weight is about 2500. (n is as set forth in Example 5.)

Then, a solution containing 4 parts of the thus obtained polyvanado silane, 2.5 parts of trioctyl amine, 25 parts of dibutyl phthalate and 0.5 part of "Tinuvin 326" (the trade mark of an ultra-violet absorber, made by Geigy Co.) is treated in the same way as in Example 5 thereby to prepare capsule-suspension. The capsule-suspension is coated on a sheet, which is dried later.

On the other hand, a dispersion solution containing the following is mixed by means of a ball mill for 10 hours. Then, the thus mixed solution is coated on another sheet which is dried later.

| | | |
|---|---|---|
| Lauryl amine gallate | 5 | parts |
| "Emalgen 920" (the trade mark of a nonion surface active agent made by Kao Sekken Co., Ltd.) | 0.3 | part |
| Succinic acid | 1 | part |
| Citric acid | 0.2 | part |
| Ethylene carbonate | 1 | part |
| Fine powdered silica | 40 | parts |
| Polyvinyl acetate emulsion | 30 | parts |
| Methyl cellulose resin | 3 | parts |
| Water | 160 | parts |

The thus obtained two different sheets are placed one on the other in such a way that their coated surfaces are faced to each other. When a hand-writing or typewriting pressure is imparted on the thus placed sheets, black letters are clearly produced on a white background thereof. Thus, pressure-sensitive copying sheets are obtained which are premanent and stable.

EXAMPLE 7

100 ml of cyclohexane and 29 parts of sodium phenyldimethyl silanolate are charged into 500 ml, three-neck distillation flask, and a solution consisting of 55 parts of vanadyltrichloride and 150 ml of cyclohexane is dropped thereinto, in a nitrogen atmosphere, at a room temperature, and for 3 hours. Then, the solution in the flack thus obtained is heated to a temperature of 50° ± 5°C, and is reacted for 3 hours. Therefore, nitrogen gas of 50% in relative humidity is introduced thereinto at a rate of 50 ml per minute for 8 hours. After the reaction, the solution is alternatively washed with 5% aqueous solution of sulfuric acid, and 3% aqueous solution of acid sodium carbonate. Then, the cyclohexane is removed from the solution by distillation to obtain 31 parts of white, solid tris (phenyldimethylsilyl) vanadate having the following general formula.

$$(C_6H_5)(CH_3)_2SiONa + VOCL_3 \rightarrow VO[(C_6H_5)(CH_3)_2SiO]_3$$

A capsule suspension is produced in the same operation as in Example 2, with 3 parts of vanadosilane (trisphenyldimethylsilyl vanadate, in place of the vanadosiloxane in Example 2, and then, 4 parts of 200 mesh cellulose powder and 2 parts of 5% polyvinyl alcohol are added into said suspension. The suspension thus obtained is coated on a paper and is dried later.

Moreover, a solution consisting of 5 parts of $$\underset{tBu}{\underset{|}{HO\diagdown\!\!\!\!\bigcirc\!\!\!\!\diagup^{OH}}}-CH_2N\diagdown^{C_4H_9}_{C_4H_9}$$

0.8 part of tartaric acid, 1 part of 2-mercapto benzothiazole, 35 parts of fine powdered silica, 17 parts of polyvinylacetate, and 180 parts of methanol is dispersed by stirring and is coated on another paper, and dried later.

The coated papers (sheets) are put one on the other in such a way that their coated surfaces are faced to each other. When a handwriting or typewriting pressure is imparted on the thus positioned sheets, black letters are clearly formed on a white background thereof. Thus, pressure-sensitive copying sheets are obtained which are stable against variation with a lapse of time.

EXAMPLE 8

A solution consisting of 20 parts of mono-sodium salt of phenylsilanetriol and 100 ml of tetrahydrofuran is put into a three-neck distillation flask. The solution is heated, and then, 20 parts of vanadyltrichloride is dropped thereinto, at a room temperature for 1 hour. After the dropping, the solution is heated to a temperature of $45° \pm 5°C$, and the reaction thereof is continued for 5 hours with the introduction of ammonia gas containing moisture, at a rate of 5 ml per minute. After the reaction, tetrahydrofuran is removed from the solution by distillation, and the solution is washed with 3% aqueous solution of sodium bicarbonate, thereby to obtain 25 parts of a white and solid compound of vanadosiloxane having about 3500 of the molecular weight and the following formula.

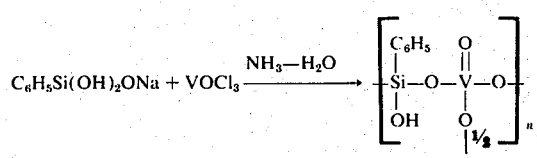

$n = 8 - 14$.

A solution consisting of 3 parts of vanadosiloxane thus obtained, 2 parts of tribenzylamine, 17 parts of dioctyl phthalate, and 2 parts of Collonate L-75 (produced by Nippon Polyurethane Co., trade mark of polyisocyanate) is coated on a paper and dried in the same operation as in Example 2.

Furthermore, a capsule suspension is produced by using a solution containing.

5 parts of 2,3-dihydroxynaphthaline-6-sulfonic cotylamide, 10 parts of oleylalcohol, and 10 parts of dibutylphthalate, in the same operation as in Example 5, and is coated on the other paper and dried, after the addition of 3 parts of thiourea and 0.5 part of gelatin into the solution.

The coated papers (sheets) are put one on the other in such a way that their coated surfaces are faced to each other. When a handwriting or typewriting pressure is imparted on the thus positioned sheets, black letters are clearly formed on a white background thereof. Thus, pressure-sensitive copying sheets are obtained which are stable against variation with a lapse of time.

EXAMPLE 9

A solution consisting of 150 parts of toluene, 22 parts of diphenylsilanediol, and 30 parts of anhydrous ferric chloride is introduced into 300 ml flask, and is refluxed to the temperature of about 110°C.

Then, the solution is continuously reacted for 8 hours with stirring and with the introduction of ammonia gas at a rate of 3 – 10 ml per minute, to obtain 18 parts of polyferrisilane (molecular weight is about 2000) having the formula of

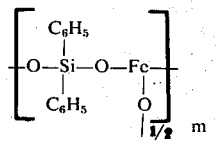

$m$ = to mol wt about 2000 – 3500

A capsule suspension is prepared with the use of a solution containing 4 parts of polyferrisilane thus obtained, 0.5 part of lauryl isoquinoline, and 20 parts of dioctylphthalate, in the same operation as in Example 5.

Moreover, a capsule suspension is obtained by using a solution containing 4 parts of 2,3-dihydroxynaphthalene-6-sulfonic anilide, and 20 parts of dibutyl maleate in the same operation as the encapsulation of polyphenol described in Example 1.

The two capsule suspensions thus obtained are mixed at the amount of 1:1, thereafter, the mixture is coated on a paper and dried later.

When the coated surface of the paper thus obtained is imparted by a handwriting or typewriting pressure, violet-black letters are clearly formed on a light background thereof.

Thus, pressure-sensitive copying sheets or recording papers are obtained which are stable against variation with a lapse of time.

EXAMPLE 10

A solution consisting of 22 parts of diphenylsilanediol, 30 parts of diphenyl dibutyl titanate, and 100 parts of tetrahydrofuran is put into a three-neck distillation flask, and is refluxed to heat.

Then, the solution is continuously reacted for 30 hours with the introduction of air at a rate of 50 – 100 ml per minute. After the reaction, a large quantity of water is added into the solution to separate polytitanosilane. Thereafter, the solution is alternately washed with 1% aqueous solution of sodium acetate, and 1% aqueous solution of sulfuric acid, and the water is removed with drying from the solution to obtain 20 parts of white and solid polytitanosilane compound having about 5500 of molecular weight and the formula of

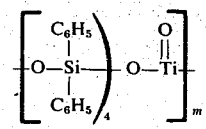

($m$ is as set forth in Example 5.)

A capsule suspension is prepared by using a solution containing 3 parts of polytitanosilane, 10 parts of heavy alkane, and 8 parts of dibutylphthalate in the same operation as in Example 2.

The capsule suspension thus obtained is coated on a paper and dried later.

Furthermore, a dispersed solution consisting of 5 parts of

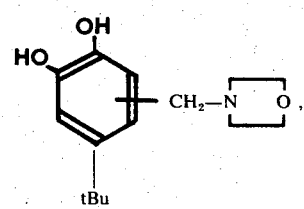

30 parts of fine powdered silica, 14 parts of polyvinylacetate, and 120 parts of methanol is satisfactorily mixed and is coated on another paper.

The coated papers (sheets) thus obtained are put one on the other in such a way that their coated surfaces are faced to each other. When a handwriting or typewriting pressure is imparted on the thus placed sheets, brown letters are clearly formed on a background thereof.

Thus, pressure-sensitive copying sheets are obtained which are stable against variation with a lapse of time.

EXAMPLE 11

A solution consisting of 2.5 parts of methylene bis-(1.2-dihydroxy-4-butyl benzene

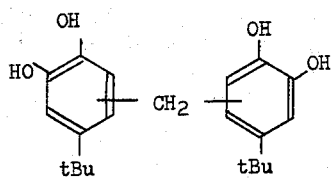

1 part of di-o-tolyl thiourea and 20 parts of dibutyl maleate is treated in the same way as in Example 1, in which polyphenol is capsulated, thereby to obtain a capsule-suspension.

On the other hand, 150 ml of n-hexane and 28 parts of methyl diphenyl silanol are put in a three-neck distillation flask of 300 ml, and 60 parts of vanadyl trichloride is dropped therein at room temperature, the dropping operation taking 4 hours. Then, the solution temperature is maintained at 50° ± 5°C, and ammonia gas, which is 50 to 90 % in relative humidity, is added into the solution at a rate of from 3 to 5 ml per minute so as to continue the reaction for 48 hours. After completion of the reaction, the solution is washed alternately with 3 % sulfuric acid aqueous solution and 3 % sodium bicarbonate. The n-hexane is removed from the thus washed solution thereby to obtain 27 parts of white solid tris (methyl diphenyl silyl) vanadate shown in the following formula, $$CH_3(C_6H_5)_2 SiOH + VOCl_3 \rightarrow VO[CH_3(C_6H_5)_2SiO]_3$$

Then, a dispersion solution containing the followings is well stirred, and is then coated on another sheet. The sheet is dried later.

| | | |
|---|---|---|
| Vanado silane thus obtained | 5 | parts |
| Tribenzyl amine | 2.5 | parts |
| Tinuvin 326 (the trade mark of n ultra-violet absorber, made by Geigy Co., in Switzerland | 0.5 | part |
| Fine powdered silica | 75 | parts |
| Copolymer of vinyl chloride vinyl acetate | 35 | parts |
| Toluene | 200 | parts |
| Ethyl acetate | 50 | parts |

The thus obtained two different sheets are piled one on the other in such a way that their coated surfaces are faced to each other. When a handwriting or typewriting pressure is imparted on the thus piled sheets, black letters are clearly produced on a light-color background thereof. Thus, pressure-sensitive copying sheets are obtained which is stable atainst variation with a lapse of time.

EXAMPLE 12

A solution containing 4 parts of benzyl gallate, 0.5 part of napthenic acid and 20 parts of dibutyl maleate is treated in the same way as in Example 11 thereby to prepare a capsule-suspension.

On the other hand, 36 parts of monosodium methyl phenyl silanol and 200 parts of xylene are put into a flask of 500 ml and these are heated at a temperature of 100° to 120°C. Then, a solution which is obtained by dispersing 25 parts of anhydrous ferric chloride in 100 parts of a solvent obtained by mixing cyclohexan and toluene at a ratio of 1 to 1, is dropped in the flask, the dropping operation being completed in one hour. The reaction of the solution is continued for 15 hours. After completion of the reaction, the solution is washed with water and the solvent is removed therefrom through distillation, as a result of which 35 parts of polyferri silane is produced.

Then, a dispersion solution containing the following is well stirred and then coated on another sheet. The sheet is then dried.

| | | |
|---|---|---|
| Polyferri silane | 3 | parts |
| Ethylene carbonate | 1 | part |
| Boric acid | 0.3 | part |
| Aluminum oxide | 33 | parts |
| Polyacrylic resin | 14 | parts |
| Toluene | 100 | parts |

The thus obtained two different sheets are placed one on the other in such a way that their coated surfaces are faced to each other. When a handwriting or typewriting pressure is imparted on the thus placed sheets, violet-black letters are clearly formed on a light-color background thereof. Thus, pressure-sensitive copying sheets are obtained which are stable against variation with a lapse of time.

EXAMPLE 13

200 ml of carbon tetrachloride, 19 parts of diphenyl methyl chloro silane and 14 parts of sodium metavanadate are put into a three-neck distillation flask, and the solution in the flask is heated so that the carbon tetrachloride causes reflux. Furthermore, the solution is reacted for eight hours while nitrogen gas which is approximately 60 % in relative humidity being added thereto. After completion of the reaction, the solution is washed with hot water of 70° to 80°C and is further washed 3 % sodium bicarbonate. Then, the carbon tetrachloride is removed from the thus treated solution through distillation as a result of which 20 parts of light-brown and paste-like vanado siloxane compound shown by the following formula is obtained.

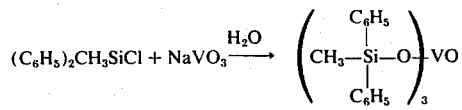

Then, 2 parts of the thus obtained vanado siloxane and 2 parts of trilauryl amine are resolved in 20 parts of dibutyl phthalate, and capsule suspension is obtained through the same treatment as in Example 14.

On the other hand, a dispersion containing the following ingredients is stirred by means of a ball mill for 8 hours.

| Palmityl amine protocatechuate | 3 | parts |
| --- | --- | --- |
| Trimethyl thiourea | 1 | part |
| Boric acid | 1 | part |
| Propylene carbonate | 1 | part |
| Fine powdered silica | 9 | parts |
| Gelatin | 1 | part |
| Emulsion of polyvinyl acetate | 9 | parts |
| Water | 70 | parts |

The thus obtained both capsule-suspension and dispersion are mixed well and then coated on a sheet, which is dried later.

When a pressure by handwriting, typewriting or of a recording pen is imparted on the thus coated surface of the sheet, black letters are clearly formed on it. Thus, pressure-sensitive copying sheets or recording sheets are obtained which are stable against variation with a lapse of time.

EXAMPLE 14

A solution containing 4 parts of palmityl protocatechuate and 20 parts of tricresyl phosphate is treated in the same way as in Example 12 thereby to prepare capsule-suspension. The capsule-suspension is coated on a sheet which is dried later.

Then, 22 parts of penyl silane triol and 100 ml of benzene are put into a three-neck distillation flask, and a solution obtained by resolving 40 parts of vanadium tetraethyl amide in 50 ml of benzene is dropped into the flask, the dropping operation being completed in one hour. Then, the solution prepared in the flask is heated at a temperature of 75° ± 5°C, and is reacted for 70 hours while air, whose relative humidity is 50 %, being added at a rate of 10 ml per minute. After completion of the reaction, the solution is washed alternatively with 3 % sulfuric acid aqueous solution and 3 % sodium acetate aqueous solution, and then the benzene is removed by distillation from the solution, as a result of which 20 parts of light-brown solid vanadosiloxane compound, whose molecular weight is 2000, is produced.

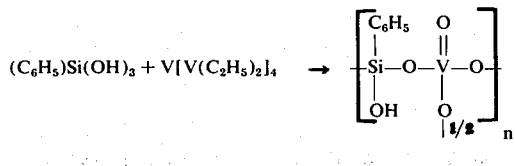

$n = 4 - 6$

A dispersion consisting of 5 parts of the thus produced vanadosiloxane, 0.5 part of benzyl pyridine, 50 parts of calcium carbonate, 15 parts of polyvinyl chloride and 150 parts of toluene is well stirred by means of a ball mill for 3 hours. The thus stirred solution is coated on another sheet and it is dried.

The thus obtained two different sheets are placed one on the other so that their coated surfaces are faced to each other. Then a handwriting or typewriting pressure is imparted on the thus placed sheets, black letters are clearly formed on the sheet. Thus pressure-sensitive copying sheets are obtained which are stable against variation with a lapse of time.

EXAMPLE 15

35 parts of phenylmethylmonosodium silanolate and 150 parts of toluene are put into a 500ml flask, and these are heated at 70° to 80°C. Then a solution obtained by dissolving 30 parts of iron alum in 100 parts of water is dropped in the flask, the dropping operation being completed in 30 minutes. The thus treated solution in the flask is reacted for 3 hours. The thus reacted solution is washed with water and the toluene is removed therefrom by distillation, as a result of which about 20 parts of brown ferrisilane (molecular weights is about 1500)

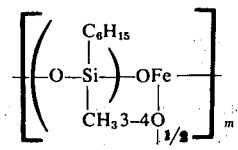

is obtained in the form of a paste. ($m$ is as set forth in Example 5.)

A solution containing 3 parts of the thus obtained ferri silane and 17 parts of Nyuporu LB-285 (the trade mark of polypropylene glycol monoether, made by Sanyo Kasei Co.) is treated in the same way as in Example 2 thereby to prepare a capsule-suspension. The capsule-suspension is coated on a sheet and it is then dried.

On the other hand, a dispersion consisting of 5 parts of 2,3-dihydroxynaphthalene-6-octylamidesulfonate, 30 parts of fine powdered silica, 10 parts of ethoxycellulose resin and 150 parts of methanol is well stirred and then coated on another sheet. The sheet is dried.

The thus obtained two different sheets are placed one on the other so that their coated surfaces are faced to each other. When a handwriting or typewriting pressure is imparted on the thus placed sheets, black letters are clearly formed on the sheet. Thus, pressure-sensitive copying sheets are obtained which are stable against variation with a lapse of time.

EXAMPLE 16

A solution consisting of 15 parts of dimethyldiacetoxysilane, 31 parts of sodium tangstate and 100 parts of n-hexane is charged into a three-neck distillation flask of 300 ml, and is reacted at a temperature of 70° ± 75°C for 48 hours while being stirred.

After completion of the reaction, the thus reacted solution is washed with hot water and the n-hexane is removed by distillation therefrom, as a result of which 14 parts of white solid polywolfram silane

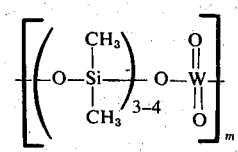

whose molecular weight is about 2000 is obtained. ($m$ is as set forth in Example 5.)

A solution containing 4 parts of the thus obtained metallosilane and 20 parts of benzyl benzoate is treated in the same way as in Example 4 thereby to prepare a capsule-suspension. The capsule-suspension is coated on a sheet and it is then dried.

On the other hand, a solution containing the following ingredients is well stirred and is then coated on another sheet. The sheet is dried.

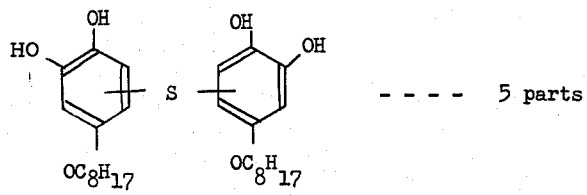 — — — — 5 parts

| Citric acid | 2 | parts |
| Aluminum oxide powder | 50 | parts |
| Ethoxy cellulose resin | 18 | parts |
| Ethanol | 60 | parts |

The thus obtained two different sheets are placed one on the other so that their coated surfaces are faced to each other. When a handwriting or typewriting pressure is imparted on the thus placed sheets, brown letters are clearly formed on the sheet. Thus, pressure-sensitive copying sheets are obtained which are stable against variation with a lapse of time.

EXAMPLE 17

A solution consisting of 100 ml of chlorinated diphenyl, and 21 parts of phenylmethyldiacetoxysilane is charged into a 300 ml three-neck distillation frask, and 27 parts of vanadyltrichloride is dropped thereinto for 3 hours. After the dropping, the solution is continuously reacted for 8 hours at a solution temperature of 150°C with the introduction of air of 50 – 80 % in relative humidity. After the reaction, the solution is alternately washed with 5 % aqueous solution of sulfuric acid and 3 % aqueous solution of acid sodium carbonate, to obtain 140 parts of colorless chlorinated diphenyl solution including vanadosilane compound which has the following general formula

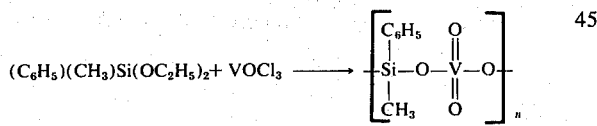

(n is as set forth in Example 5.)

Thereafter, a capsule suspension is prepared by using the chlorinated diphenyl solution of vanadosilane thus obtained, in the same operation as in Example 2.

Furthermore, a capsule suspension is produced by using a solution containing 3 parts of N,N-bis(1,2-dihydroxy-4-t-butyl benzyl) laurylamine, shown by the general formula of

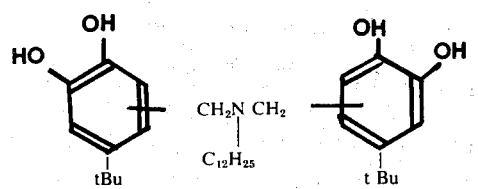

and 20 parts of dibutylmaleate, in the same way as in Example 11.

This thus obtained two capsule suspensions are mixed, and are coated on a paper, than dried later.

When the coated surface of the paper (sheet) thus obtained is imparted by a handwriting or typewriting pressure, red letters are clearly formed on the sheet.

Thus, pressure-sensitive copying sheets or recording papers are obtained which are stable against variation with a lapse of time.

EXAMPLE 18

A solution consisting of 150 ml of xylene, 53 parts of hexaphenyl disiloxane, and 6 parts of vanadium pentaoxide, is put, into 300 ml three-neck distillation frask, and is continuously reacted for 72 hours at a temperature of 100° ± 5°C with the introduction of nitrogen gas having 50 – 80 % in relative humidity. After the reaction, xylene is removed therefrom by distillation and then, the solution is washed with 1 % aqueous solution of sodium hydroxide, to obtain 26 parts of white solid tris (triphenyl silyl) vanadate.

Thereafter, a capsule suspension is prepared by using a solution containing

| Vanadosilane | 3 parts |
| diphenylamine | 2 parts |
| Nisseki Hisol SAS-295 | 17 parts |

(produced by Nippon Sekyu Kagaku Co., trade mark of alkylene biphenyl) in the same way as in Example 2.

Furthermore, a dispersed solution is prepared by using a homomixer, which contain N,N-bis (1,2-dihydroxy-4-t-butylbenzyl) butylamine shown by the formula of

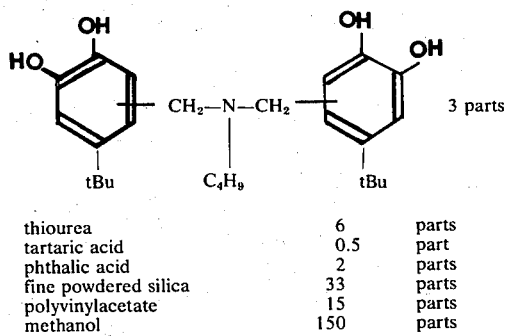 3 parts

| thiourea | 6 | parts |
| tartaric acid | 0.5 | part |
| phthalic acid | 2 | parts |
| fine powdered silica | 33 | parts |
| polyvinylacetate | 15 | parts |
| methanol | 150 | parts | and is coated on another paper and then, is dried.

The coated paper (sheets) are put one on the other in such a way that their coated surfaces are faced to each other.

When a handwriting or typewriting pressure is imparted on the thus put sheets, black leters are clearly formed on a white background thereof. Thus, pressure-sensitive copying sheets are obtained which are stable against variation with a lapse of time.

EXAMPLE 19

A capsule suspension containing ferrisilane is prepared with the ferrisilane obtained by the Example 9 in the same way as in Example 2, and is coated on a paper, and then, is dried.

Furthermore, a dispersed solution, which contains

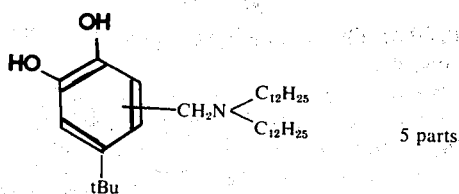        5 parts

| | | |
|---|---:|---|
| ethylene carbonate | 1 | part |
| fine powdered silica | 50 | parts |
| polyvinylacetate | 20 | parts |
| methanol | 200 | parts | is prepared by using a homomixer, and is coated on another paper, and then, is dried.

The coated papers (sheets) thus obtained are put one on the other in such a way that their coated surfaces are faced to each other.

When a handwriting or typewriting pressure is imparted on the thus put sheets, voilet-black letters are clearly formed on a white background thereof. Thus, pressure-sensitive copying sheets are obtained which are stable against variation with a lapse of time.

EXAMPLE 20

A solution containing 16 parts of phenylsilanetriol, 32 parts of bismuth, and 100 parts of xylene is put into 300 ml three-neck distillation flask, and is continuously reacted for 3 hours at a solution temperature of 130°C with the introduction of ammonia gas having 50 % in relative humidity at a rate of 5 – 20 ml per minute. And then, after the instruction of the ammonia gas is stopped, the reaction is further continued for 30 hours.

Thereafter, the solution is alternatively washed with 3 % aqueous solution of sulfuric acid, and 2 % aqueous solution of sodium acetate, and xylene is removed therefrom by distillation, to obtain 18 parts of white and solid polybismate silane compound having 2500 of molecular weight, and the formula of $$\left[\left(O-\underset{\underset{OH}{|}}{\overset{\overset{C_6H_5}{|}}{Si}}\right)_{3-4}-O-\underset{\underset{1/2}{|}}{Bi}\right]_m$$

($m$ is as set forth in Example 5.)

Furthermore, a capsule suspension is prepared by dissolving 3 parts of metallosilane into 20 parts of oleylalcohol, and is coated on a paper, and then, is dried in the same way as in example 4.

Then, a dispersed solution, which contains

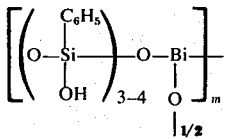 3 parts

| | |
|---|---|
| fine powdered silica | 11 parts |
| polyvinylacetate | 4 parts |
| methanol | 50 parts | is prepared by using a homomixer, and is coated on another paper, and then, is dried.

The coated papers (sheets) are put one on the other in such a way that their coated surfaces are faced to each other.

When a handwriting or typewriting pressure is imparted on the thus placed sheets, letters of orange color are clearly formed on a white background thereof. Thus, pressure-sensitive copying sheets are obtained which are stable against variation with a lapse of time.

EXAMPLE 21

A solution consisting of 45 parts of sodium triphenylsilanolate, 12 parts of iron alum, and 200 parts of toluene is put into 500 ml flask, and is reacted for 15 hours with stirring at a temperature of 70° – 80°C. After the reaction, the solution is washed, and thereafter benzene is removed therefrom by distillation to obtain 30 parts of ferriphenylsilane shown by the formula of

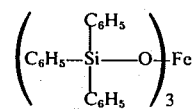

A capsule suspension is then prepared, which contains

| | | |
|---|---:|---|
| ferriphenylsilane thus obtained | 3 | parts |
| lauryldiadine | 0.6 | part |
| dibutylphthalate | 27 | parts | in the same way as in Example 11.

Furthermore, a dispersed solution is prepared by using a homomixer, which contains,

| | | |
|---|---:|---|
| 2,3-dihydroxynaphtalene-6-calcium sulfonate | 5 | parts |
| ethylene carbonate | 3 | parts |
| calcium carbonate | 30 | parts |
| emulsion of polyacrylic acid | 12 | parts |
| water | 80 | parts |
| methanol | 20 | parts | and is mixed with the aforementioned capsule-suspension, and then, the mixture is coated on a paper, and dried later.

When the coated surface of the paper thus obtained is imparted by a handwriting or typewriting pressure, brown letters are clearly formed on a white background thereof.

Thus, pressure-sensitive copying sheets or recording papers are obtained which are stable against variation with a lapse of time.

EXAMPLE 22

A solution consisting of

| | |
|---|---|
| vanadosilane obtained by Example 7 | 5 parts |
| Nyuporu LB-625 (produced by Sanyo Kasei Co., a trade mark of monoether of polypropyleneglycol) | 30 parts |
| Epikote 828 (produced by Shell Chemical Co., a trade mark for an epoxy resin) | 6 parts | is added into a solution containing

| | |
|---|---|
| carboxymethylcellulose | 3 parts |
| water | 77 parts |
| Epicure U (produced by U.S.A. Shell Chemical Co., a trade mark of amine-additives of epoxy resin | 3 parts | with stirring for 24 hours, at a temperature of 30°C. To obtain an emulsion having particles of 4 – 5 μ.

Thus, a microcapsule emulsion including Nyuporu LB-625 solution (a color former) is obtained by the reaction of Epikote 828 and Epicure U, at an interface of Nyuporu LB-625 and water.

However, 2 parts of polyvinylalcohol and 8 parts of cellulose powders having particle size of 400 mesh is added into the above-mentioned microcapsule emulsion, and thereafter, the thus obtained microcapsule emulsion is coated on a paper, and is dried later.

Furthermore, a dispersed solution, which contains

| | | |
|---|---|---|
| 2,3-dihydroxynaphthalene-6-sulfonic acid dimethyl benzyl lauryl ammonium salt | 5 | parts |
| di-o-tolyl thiourea | 2.5 | parts |
| citric acid | 2 | parts |
| fine powdered silica | 50 | parts |
| polyvinylbutylal | 20 | parts |
| toluene | 100 | parts |
| methanol | 100 | parts | is coated on another paper and dried, after treating with ball mill for 5 hours.

The coated papers (sheets) are put one on the other in such a way that their coated surfaces are faced to each other.

When a handwriting or typewriting pressure is imparted on the thus placed sheets, black letters are clearly formed on a white background thereof. Thus, pressure-sensitive copying sheets are obtained which are stable against variation with a lapse of time.

EXAMPLE 23

The sheet coated with the capsule-suspension obtained in Example 6 and the sheet coated with polyhydroxyphenol obtained in Example 18 are combined together so that the coated surfaces of the two different sheets are faced to each other.

When a handwriting or typewriting pressure is imparted on the thus combined sheets, black letters are clearly produced on the sheet. Thus, pressure-sensitive copying sheets are obtained which are stable against variation with a lapse of time.

EXAMPLE 24

The sheet coated with the capsule suspension obtained in Example 2 and the sheet coated with the polyhydroxyphenol obtained in Example 4 are combined together so that the coated surfaces of the two different sheets are faced to each other.

When a handwriting or typewriting pressure is imparted on the thus combined sheets, black letters are clearly produced on the sheet. Thus, pressure-sensitive copying sheets are obtained which are stable against variation with a lapse of time.

EXAMPLE 25

The sheet coated with the capsule suspension obtained in Example 3 and the sheet coated with the polyhydroxyphenol obtained in Example 7 are combined together so that the coated surfaces of the two different sheets are faced to each other.

When a handwriting or typewriting pressure is imparted on the thus combined sheets, black letters are clearly produced on the sheet. Thus, pressure-sensitive copying sheets are obtained which are stable against variation with a lapse of time.

EXAMPLE 26

The sheet coated with the capsule-suspension obtained in Example 7 and the sheet coated with the polyhydroxyphenol obtained in Example 3 are combined together so that the coated surfaces of the two different sheets are faced to each other.

When a handwriting or typewriting pressure is imparted on the thus combined sheets, black letters are clearly produced on the sheet. Thus, pressure-sensitive copying sheets are obtained which are stable against variation with a lapse of time.

EXAMPLE 27

The sheet coated with the capsule suspension obtained in Example 7 and the sheet coated with the polyhydroxyphenol obtained in Example 18 are combined together so that the coated surfaces of the two different sheets are faced to each other.

When a handwriting or typewriting pressure is imparted on the thus combined sheets, black letters are clearly produced on the sheet. Thus, pressure-sensitive copying sheets are obtained which are stable against variation with a lapse of time.

EXAMPLE 28

A colorless and transparent ink is prepared by dissolving and stirring the following ingredients.

| | |
|---|---|
| Vanadosilane obtained in Example 6 | 30 parts |
| Ethylene carbonate | 30 parts |
| Polyvinyl pyrrolicone | 36 parts |
| Heavy alkane | 250 parts |
| fine powdered silica | 30 parts |

Then, the polyhydroxyphenol dispersion in Example 3 is coated on a sheet and then the sheet is dried.

Thus, a recording material is obtained which is outstanding in that when letters are written on the thus coated sheet with a letter writing tool such as a recording pen, a ball-point pent and a fibrous pen, which is impregnated with the colorless and transparent ink, or are stamped with a stamp wetted with the ink, the letters clearly appear black on the sheet and are stable against variation with a lapse of time.

EXAMPLE 29

A light-colored and transparent ink is prepared by dissolving and stirring the following ingredients.

| | |
|---|---|
| Ferrisiloxane obtained in Example 5 | 20 parts |
| Propylene carbonate | 20 parts |
| Polyvinyl pyrrolidene | 40 parts |
| Phenyl cellosolve | 300 parts |
| fine powdered silica | 50 parts |

Then, the polyhydroxyphenol dispersion in Example 16 is coated on a sheet and it is dried.

Thus, a recording material is obtained which is superior in that when letters are written on the thus prepared sheet with the ink in the same way as in Example 28, the letters clearly appear violet-black on the sheet and are stable against variation with a lapse of time.

EXAMPLE 30

A dispersion consisting of the following ingredients is well emulsified by means of a ball-mill thereby to prepare a colorless and transparent ink:

| | |
|---|---|
| octyl gallate | 10 parts |
| Polyvinyl pyrrolidone | 30 parts |
| "Emalgen 306P" (the trade mark of nonion surface active agent, made by Kao Sekken Co., Ltd.) | 250 parts |
| fine powdered silica | 25 parts |

On the other hand, the vanado silane dispersion obtained in Example 11 is coated on a sheet and it is then dried.

Thus, a recording material is obtained which is outstanding in that, when letters are written with the thus prepared ink on the sheet in the same way as in Example 28, the letters clearly appear black on the sheet and are stable against variation with a lapse of time.

EXAMPLE 31

A colorless and transparent ink is prepared by resolving and stirring the following ingredients:

| | |
|---|---|
| 2,3-dihydroxynaphthalene-6-calcium sulfonate | 20 parts |
| Ethylene carbonate | 10 parts |
| Polyvinyl pyrrolidone | 30 parts |
| Polyethylene glycol | 300 parts |
| fine powdered cilica | 50 parts |

Then, the vanado silane dispersion in Example 14 is coated on a sheet and it is then dried.

Thus, a recording material is obtained which is superior in that, when letters are written on the thus coated sheet with the thus prepared ink in the same way as in Example 28, the letters are developed black on the sheet and are stable against variation with a lapse of time.

EXAMPLE 32

The transparent ink in Example 31 is impregnated in a typewriter ribbon type.

Then, a coated sheet is provided in the ame way as in Example 30. same

Thus, a recording material is obtained which is superior in that, when a typewriting pressure is imparted through the ribbon type on the sheet, black letters are produced on the sheet only and are stable against variation with a lapse of time.

EXAMPLE 33

The ink obtained in Example 29 is impregnated in a typewriter ribbon tape. Then, the polyhydroxyphenol dispersion of Example 3 is coated on a sheet and it is then dried.

Thus, a recording material is obtained which is outstanding in that, when a typewriting pressure is imparted through the ribbon tape on the sheet, black letters are produced on the sheet only and are stable against variation with a lapse of time.

EXAMPLE 34

The transparent ink obtained in Example 30 is impregnated in a typewriter ribbon tape. Then, the vanado siloxane dispersion of Example 14 is coated on a sheet and it is then dried.

Thus, a recording material is obtained which is outstanding in that, when a typewriting pressure is imparted through the ribbon tape on the sheet, black letters are produced on the sheet only and are stable against variation with a lapse of time.

EXAMPLE 35

A colorless and transparent ink is prepared by resolving and stirring the following ingredients:

| | |
|---|---|
| Polyvanadosiloxene obtained in Example 22 | 30 parts |
| Nissiki Hisol SAS-LH (the trade name of triphenyl alkane solvent, made by Nihon Sekyu Kagaku Co., Ltd., Japan) | 270 parts |
| Polyvinyl pyrrolidone | 40 parts |
| fine powdered silica | 30 parts |

Then, the polyhydroxyphenol dispersion in Example 10 is coated on a sheet and it is then dried.

Thus, a recording material is obtained which is superior in that, when letters are written on the thus coated sheet with the thus prepared ink in the same way as in Example 28, the letters are developed black or the sheet and are stable against variation with a lapse of time.

EXAMPLE 36

The transparent ink in Example 35 is impregnated in a typewriter ribbon tape.

Then, the polyhydroxyphenol dispersion in Example 10 is coated on a sheet and it is then dried.

Thus, a recording material is obtained which is superior in that, when a typewriting pressure is imparted through the ribbon tape on the sheet, black letters are produced on the sheet only and are stable against variation with a lapse of time.

What we claim is:

1. A recording material for recording visual information comprising two colorformer compositions the first having one or more metallosilane compounds therein selected from the group of metallosilanes having the formula A – D (below) and the other colorformer composition containing at least one polyhydroxyphenol compound selected from the group of polyhydroxyphenols having the general formulae E – H (below); said metallosilane compound composition and polyhydroxyphenol composition being physically separated one from the other prior to visual image formation and forming colored compounds by chemical reaction of the metallosilane with the polyhydroxyphenol upon physical mixing of the two compositions A. metallosilanes selected from the group consisting of:

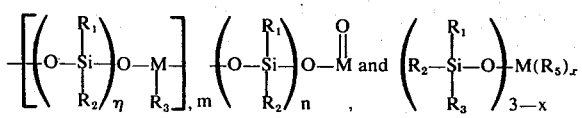

B. metallosilanes selected from the group consisting of:

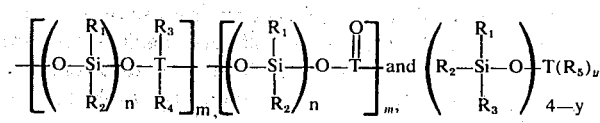

C. metallosilanes selected from the group consisting of:

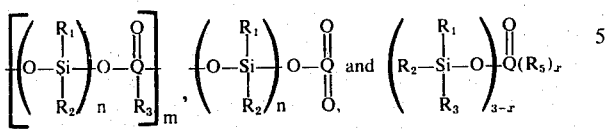

D. metalosilanes selected from the group consisting of:

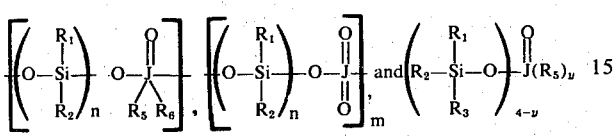

Wherein $R_1$, $R_2$, $R_3$ and $R_4$ are -OH, $-O_{1/2}$, an alkyl or an aryl radical;

$R_5$ and $R_6$ are an anion of an organic or inorganic acid, oxygen or a ligand M is a trivalent metal T is a tetravalent metal Q is a pentavalent metal J is a hexavalent metal $m$ and $n$ each are a number from 1 to 30

$x$ is 0, 1 or 2

$y$ is 0, 1, 2, 3

(E)

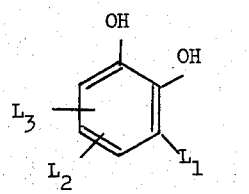

(F)

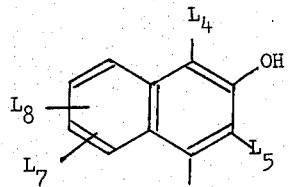

(G)

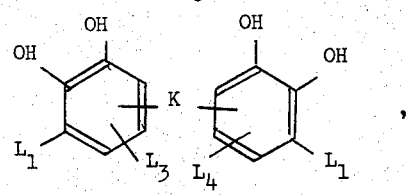

(H)

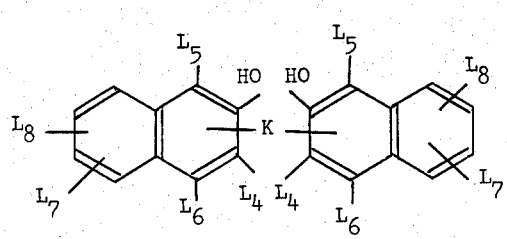

Wherein each of $L_1$, $L_4$ and $L_5$ are individually selected from the group consisting of H, —OH, alkyl, aryl or acyl radicals with either $L_4$ or $L_5$ being H; and $L_2$, $L_3$, $L_6$, $L_7$, and $L_8$ are individually selected from the group consisting of H, —OH, —CHO, —$NO_2$, $NH_2$, alkyl, aryl, acyl, —$SO_3M$ (M is selected from the group of alkali and alkaline earth cations and primary to quaternary amines,), a COY (Y is selected from the group of H, alkyl radicals aryl radicals, and primary to quarternary amines) sulfonic acid amide, amine sulfonate, carboxylic acid amide, amine carbonate, —$CH_2Z$ (Z is

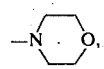

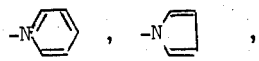

-NHCOX,

(X is alkyl, or aryl, A and B are H, alkyl, or aryl radicals); and K is selected from the group consisting of —, —O—, —$SO_2$—, —N=N—, —$(CH_2)_x$— ($x$ is an integer of 1 to 10), and

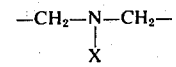

(X is H, alkyl, or aryl radicals).

2. A recording material as claimed in claim 1 wherein at least one of the colorformer compositions is enclosed into frangible microcapsules in an oil dispersion thereof and wherein both color-former compositions are coated each up on a surface of a substrate whereby they react to form an image upon rupture of said frangible microcapsules in areas where the energy is applied to rupture said microcapsule.

3. A recording material according to claim 1 wherein each colorformer composition is enclosed in frangible microcapsules as an oil dispersion thereof and both colorformer compositions in microcapsule form are coated together on the same surface of a substrate.

4. A recording material according to claim 1 wherein at least one colorformer composition is microencapsulated in an oil dispersion and each composition is coated upon a separate surface of separate substrates and the caoted surfaces are juxtaposed whereby a colored image is formed in areas of the juxtaposed surfaces where energy is applied to rupture said microcapsule.

5. A recording material as claimed in claim 1 wherein a substrate is coated with one of said colorformer compositions and the other of said colorformer compositions, in the form of a liquid or paste ink is applied, in printed image-forming areas, to the coated substrate.

6. A recording material as claimed in claim 1 wherein a paper substrate is coated with one of said colorformers and is in local contact with a porous substrate inpregnated with the other of said colorformers whereby said visual image is formed in areas where pressure is applied to said porous substrate to transfer said other colorformer to said paper substrate thereon to react with said one colorformer whereby an image is formed.

7. A recording material as claimed in claim 1 wherein the polyhydroxyphenol colorformer composition includes an antioxidant sulfur compound.

8. A recording material as claimed in claim 1 wherein the polyhydroxyphenol colorformer composition includes an acidic antioxidant material.

9. A recording material as claimed in claim 1 wherein at least one of said two colorformer compositions contains at least one compound selected from the group consisting of water-insoluble amines, basic nitrogen compounds of the formulae I – Q and an alkylene carbonate of the formula R (I)    (J)    (K)

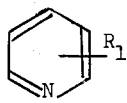 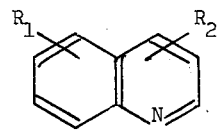 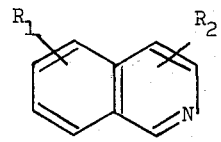

(L)    (M)    (N)

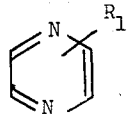 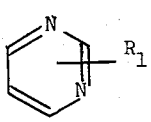 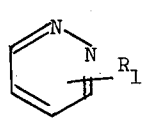

(O)    (P)    (Q)

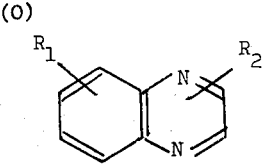 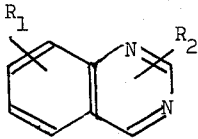 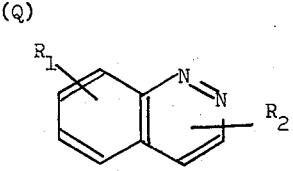

Wherein $R_1$ and $R_2$ are H, —OH, alkyl, aryl, or acyl radicals (R)

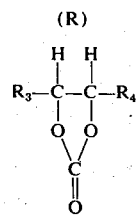

Wherein $R_3$ and $R_4$ are H. alkyl, or aryl radicals.

10. A recording material as claimed in claim 9 wherein at least one of the colorformer compositions is enclosed into frangible microcapsules in an oil dispersion thereof and wherein both color-former compositions are coated each up on a surface of a substrate whereby they react to form an image upon rupture of said frangible microcapsules in areas where the energy is applied to rupture said microcapsule.

11. A recording material according to claim 9 wherein each colorformer composition is enclosed in frangible microcapsules as an oil dispersion thereof and both colorformer compositions in microcapsule form are coated together on the same surface of a substrate.

12. A recording material according to claim 9 wherein at least one colorformer composition is microencapsulated and each composition is coated upon a separate surface of separate substrates and the coated surfaces are juxtaposed whereby a color image is formed in areas of the juxtaposed surfaces where energy is applied to rupture said microcapsule.

13. A recording material as claimed in claim 9 wherein a substrate is coated with one of said colorformer compositions and the other of said colorformer compositions, in the form of a liquid or paste ink is applied, in printed image-forming areas, to the coated substrate.

14. A recording material is claimed in claim 9 wherein a paper substrate is coated with one of said colorformers and is in local contact with a porous substrate inpregnated with the other of said colorformers whereby said visual image is formed in areas where pressure is applied to said porous substrate to transfer said other colorformer to said paper substrate thereon to react with said one colorformer whereby an image is formed.

15. A recording material as claimed in claim 9 wherein the polyhydroxyphenol colorformer composition includes an antioxidant sulfur compound.

16. A recording material as claimed in claim 9 wherein the polyhydroxyphenol colorformer composition includes an acidic antioxidant material.

* * * * *

UNITED STATES PATENT OFFICE
CERTIFICATE OF CORRECTION

Patent No. 3,912,831  Dated  October 14, 1975

Inventor(s)  Masao Kan et al.

It is certified that error appears in the above-identified patent and that said Letters Patent are hereby corrected as shown below:

Please enter the assignee as follows:

Pilot Man-Nen-Hitsu Kabushiki Kaisha

Signed and Sealed this sixteenth Day of March 1976

[SEAL]

Attest:

RUTH C. MASON
*Attesting Officer*

C. MARSHALL DANN
*Commissioner of Patents and Trademarks*